(12) United States Patent
Cansell et al.

(10) Patent No.: US 7,736,519 B2
(45) Date of Patent: Jun. 15, 2010

(54) METHOD FOR PROCESSING AQUEOUS EFFLUENTS CONTAINING METAL NITRATE OR NITRITE SALTS

(75) Inventors: François Cansell, Pessac (FR); Marie Gaudre, Le Haillan (FR); Jean-Michel Tauzia, Blanquefort (FR)

(73) Assignee: Centre National de la Recherge Scientifique (C.N.R.S.), Paris (FR)

( * ) Notice: Subject to any disclaimer, the term of this patent is extended or adjusted under 35 U.S.C. 154(b) by 605 days.

(21) Appl. No.: 11/629,659

(22) PCT Filed: Jun. 17, 2005

(86) PCT No.: PCT/FR2005/001525

§ 371 (c)(1),
(2), (4) Date: May 21, 2007

(87) PCT Pub. No.: WO2006/008377

PCT Pub. Date: Jan. 26, 2006

(65) Prior Publication Data

US 2008/0190866 A1 Aug. 14, 2008

(30) Foreign Application Priority Data

Jun. 18, 2004 (FR) .................................. 04 06680

(51) Int. Cl.
*C02F 1/72* (2006.01)
*C02F 101/16* (2006.01)
*C02F 101/20* (2006.01)
*C02F 101/38* (2006.01)

(52) U.S. Cl. ........................ 210/721; 210/737; 210/761; 210/903; 210/912; 210/913

(58) Field of Classification Search .................. 210/761
See application file for complete search history.

(56) References Cited

U.S. PATENT DOCUMENTS

| 5,118,447 | A  |   | 6/1992  | Cox et al.       |         |
|-----------|----|---|---------|------------------|---------|
| 5,480,630 | A  | * | 1/1996  | Arai et al. ..................... | 423/625 |
| 5,641,413 | A  | * | 6/1997  | Momont et al. ............. | 210/761 |
| 5,720,889 | A  |   | 2/1998  | Deaton et al.    |         |
| 6,132,491 | A  | * | 10/2000 | Wai et al. ...................... | 75/722  |
| 6,332,986 | B1 | * | 12/2001 | Johnson et al. ............. | 210/758 |
| 6,379,562 | B1 | * | 4/2002  | Burdeniuc .................. | 210/761 |
| 6,419,837 | B1 |   | 7/2002  | Akse             |         |
| 6,902,679 | B2 | * | 6/2005  | Burdeniuc .................. | 210/761 |
| 6,958,122 | B1 | * | 10/2005 | Gidner et al. ............... | 210/761 |
| 7,235,224 | B2 | * | 6/2007  | Myeong et al. .......... | 423/592.1 |

FOREIGN PATENT DOCUMENTS

EP 0 341 792 11/1989

OTHER PUBLICATIONS

Dell'orco P C et al: "Reactions of Nitrate Salts With Ammonia in Supercritical Water" Industrial & Engineering Chemistry Research, American Chemical Society. Washington, US, vol. 36, 1997, pp. 2547-2557, XP000827945 ISSN: 0888-5885 the whole document.

* cited by examiner

*Primary Examiner*—Peter A Hruskoci
(74) *Attorney, Agent, or Firm*—Young & Thompson

(57) ABSTRACT

The invention relates to a method for processing an aqueous effluent (E) containing in solution at least one type of metal (M) nitrite or nitrate whose oxide is stable in an aqueous medium consisting (I) in introducing cations $NH_4+$ in aqueous solution, generally in the form of an aqueous ammonia solution, into the aqueous effluent and, subsequently (II) in processing the obtainable medium at a temperature ranging from 100 to 700° C. and a pressure of 1-50 MPa (i.e. from 10 to 500 bar), thereby converting the metal (M) nitrite or nitrate into metal (M) oxide, nitrogen and water.

19 Claims, No Drawings

METHOD FOR PROCESSING AQUEOUS EFFLUENTS CONTAINING METAL NITRATE OR NITRITE SALTS

The present invention relates to a method for processing aqueous effluents containing metal nitrate or nitrite salts, allowing the conversion of the salts into insoluble metal species of the oxide type, without formation of by-products such as nitrogenous acids or oxides. The method is especially suitable for eliminating metal species of the nitrate or nitrite type in industrial aqueous effluents prior to their discharge into the environment.

Numerous effluents obtained at the end of industrial processes contain nitrate or nitrite metal salts. By way of example, effluents arising from the acid attack of metals by nitric acid may especially be cited, and in particular the effluents obtained during the processing of metals in nitric acid pickling baths, such as those used for example for pickling metal sheets prior to surface treatments.

Taking into account the standards in force, which limit the content of metal ions and especially nitrite and nitrate anions in the effluents discharged by industries, it is necessary to process the aqueous media containing metal sulphates or nitrates obtained according to the aforesaid methods, so as to substantially eliminate the metal salts, before being able to contemplate their discharge into the environment. So as to carry out the elimination of metal salts in aqueous effluents of this type, different solutions have been proposed in the past, which, for example, employ processes of precipitation, bio-precipitation, crystallisation, ion exchange, electrolysis, or more specific techniques such as electrodialysis for example.

Some of these methods of the state of the art, some do not prove sufficiently efficient to eliminate quantitatively the metal salts within the medium. This is especially the case with certain crystallisation or precipitation methods. Others, such as electrolysis, certainly prove more efficient, but involve high processing costs. In addition, the majority of the methods described within the framework of the processing of effluents containing nitrates or nitrites lead ultimately to the production of nitric or nitrous acid and/or of oxides of nitrogen, which constitute pollutants which it is necessary to eliminate from the effluent in subsequent stages (filtration, trapping, etc.) before considering discharge into the environment, thereby once again entailing an increase in the cost of the process.

It is an aim of the present invention to provide a new method allowing the elimination of metal nitrate or nitrite salts present in an aqueous medium such as an industrial effluent, which is of sufficient advantage in terms of efficiency and cost to substitute for the currently known techniques for elimination of salts, and which preferably exhibits a more advantageous cost/efficiency ratio than the techniques which have been described up to now.

To this end, a subject-matter of the present invention is a method for treating an aqueous effluent E containing, in solution, at least one nitrate or nitrite of a metal M, said metal having an oxide which is stable in an aqueous medium, and wherein the said method comprises the steps consisting in:

(I) introducing into the aqueous effluent E, $NH_4^+$ cations in aqueous solution, said $NH_4^+$ cations being introduced preferably in the form of an aqueous ammonia solution; then (II) treating the medium obtained, at a temperature of 100 to 700° C. and at a pressure of 1 to 50 MPa (i.e. between 10 and 500 bar), whereby nitrite or nitrate of the metal M is converted into an oxide of the metal M, nitrogen and water.

The method of the invention makes it possible to convert the metal M nitrate or nitrite into an insoluble form of the metal, i.e. An oxide of metal M. This conversion of a soluble form (nitrate or nitrite) of the metal M into an insoluble form may advantageously be used for extracting the metal M from the aqueous solution. In this case, the metal M oxide obtained at the end of step (II) is extracted from the medium by a solid/liquid separation, in general by a filtration. Any other solid/liquid separation method may however be considered, such as, for example, separation by centrifuging, or by decanting.

Provided that step (II) is carried out for a period of time sufficient for allowing the conversion to actually operate, the processing of the aqueous effluent E at a temperature of 100 to 700° C. and a pressure of 1 to 50 MPa permits, in most cases, a substantial conversion of the nitrate or nitrite of the metal M into oxide, generally insoluble. Depending on the nature of the metal M, the rate of conversion of the metal M nitrate or nitrite into oxide obtained at the end of step (II) may vary in fairly large measure; however, in the most general case, the aforesaid temperature and pressure conditions are capable of allowing conversion in the form of oxide of at least 60%, and most often at least 70% of the nitrates or nitrites of the metal M present in the initial aqueous effluent E. In the most cases, a rate of conversion of the metal M nitrates or nitrites into oxide of 80% or more is obtained, the conversion rate being generally at least 85%, and may reach 90%, or 95%, and even 99% or more in certain cases.

Especially so as to allow the conversion of the metal M nitrates or nitrites into oxide to be as efficient as possible, it is generally preferable for step (II) of the method to be conducted at a temperature of at least 250° C., preferably at least 300° C., and advantageously at least 350° C. Thus, according to an advantageous embodiment, step (II) is conducted at a supercritical temperature, i.e. a temperature of more than 374° C. Moreover, especially in order to reduce the costs of the process, the reaction may be conducted at a temperature at or below 600° C., the temperature generally remaining at or below 550° C. Thus, in order to obtain an advantageous cost/efficiency ratio for the method, the temperature for implementation of step (II) is advantageously between 250° C. and 550° C., and preferably between 300° C. and 500° C. (typically between 400 and 500° C.).

On the other hand, in order to carry out efficient conversion of metal M nitrates or nitrites into oxide, step (II) is advantageously conducted at a pressure of at least 10 MPa (100 bar), this pressure preferably being at least 20 MPa (200 bar). Thus, for example, the method of the invention may be conducted at a supercritical pressure, i.e. a pressure of more than 22.1 MPa (221 bar). Within this framework, according to a specific embodiment, step (II) is conducted under supercritical conditions, i.e. a temperature of more than 374° C. and a pressure of more than 22.1 MPa (221 bar). Especially in order to limit the cost of the process, step (II) may advantageously be conducted at a pressure at or below 40 MPa (400 bar), or even at or below 30 MPa (300 bar). Thus, advantageously especially in terms of efficiency and cost, step (II) may for example be conducted at a pressure of between 10 and 40 MPa (for example between 20 and 35 MPa, typically between 25 and 30 MPa).

Thus, according to an embodiment of the invention which proves advantageous in most cases, step (II) is conducted at a temperature of between 300° C. and 550° C. and a pressure of between 10 and 40 MPa, and generally under supercritical conditions (for example between 400 and 500° C. and at a pressure of 25 to 30 MPa).

It should be emphasised that in addition to the obtained efficient conversion of the nitrates or nitrites of the effluent E into insoluble metal oxides, the method of the invention makes it further possible to effect this transformation without leading to the formation of undesirable by-products such as nitrogenous acids or oxides. To this end, however, in most cases, it is preferable that, in step (I), the $NH_4^+$ cations in aqueous solution are introduced so as to obtain a molar ratio $NH_4^+/NO_3^-$ of at least 1:3 in the medium to be processed in step (II). Preferably, in order to avoid as far as possible the formation of $NO_x$ or acid by-products, the $NH_4^+$ cations are introduced in step (I) such that the molar ratio $NH_4^+/NO_3^-$ is at least 2:3 and advantageously at least 3:3. Especially in order to reduce the cost of the process, this molar ratio however advantageously remains at or below 6:3. Thus, according to an advantageous embodiment, the $NH_4^+$ cations are introduced in step (I) such that the molar ratio $NH_4^+/NO_3^-$ in the medium to be processed in step (II) is between 4:3 and 6:3, for example between 4.5:3 and 5.5:3, this ratio being typically of the order of 5:3.

Taking into account these different aspects, the method of the invention is especially advantageous for carrying out the processing of industrial effluents prior to their discharge into the environment. In fact, in most cases, it is possible to contemplate the discharge of the liquid and gaseous media obtained at the end of step (II), which most often have an extremely low content of metal salts, acids and gases such as nitrogen oxide. The solid phase itself is most often easily recoverable, for example by a simple step of filtration or of decantation.

Especially, the method of the invention is suitable for the processing of effluents arising from treatment of metals by nitric acid. However, more generally, most of aqueous effluents containing nitrates and/or nitrites of metals having oxides stable in an aqueous medium, may be processed according to the method of the invention.

Most often, the metal M of which the nitrate or nitrite is present within the effluent E processed according to the method of the invention is selected from:

- certain alkaline earth metals such as beryllium (Be) and magnesium (Mg) or strontium (Sr);
- transition metals (group "d" of the Periodic Table of Elements), such as scandium (Sc), titanium (Ti), vanadium (V), chromium (Cr), manganese (Mn), iron (Fe), cobalt (Co), nickel (Ni), copper (Cu), zinc (Zn), niobium (Nb) and molybdenum (Mo),
- metals of the lanthanide or actinide series (group "f" of the Periodic Table) such as, especially, thorium (Th), uranium (U) and plutonium (Pu);
- other metals such as aluminium, or lead or tin.

In particular, the method of the invention proves well adapted for the treatment of an aqueous medium (m) containing iron nitrates, iron nitrites, or mixtures of these salts.

According to a particular variant of the method of the invention, the aqueous effluent E processed may further contain an organic compound, in addition to the nitrates and/or nitrites present in aqueous solution.

In this case, step (II) may advantageously be used for carrying out an hydrothermal degradation of the organic compound. It should in fact be emphasised that the temperature and pressure conditions of step (II) are conditions that are well adapted to hydrothermal degradation of the majority of organic compounds. By "hydrothermal degradation of an organic compound" there is to be understood, in the meaning of the present description, the conversion of an organic species into mineral species (for example conversion in the form of water, and $CO_2$ and/or CO, when the degraded organic compound contains only the elements C, H and O), by exposing to pressure and temperature, generally in the presence of an oxidising agent. Such "hydrothermal degradations" of organic species into mineral species have been described in particular in the article entitled: "Hydrothermal oxidation: a new concept for treatment of industrial and urban liquid waste" by M. Bottreau (*Supercritical Fluids and Materials*, ISBN-2-905267-39-9).

Thus, when the effluent E contains an organic compound which it is sought to eliminate, step (II) is in general conducted with the additional presence of an oxidising agent, in an amount sufficient to oxidise the said organic compound under the conditions of step (II).

The oxidising agent used within this framework may be selected from any oxidising agent customarily used in the field of hydrothermal degradation, such as, for example gaseous oxygen, hydrogen peroxide, nitric acid, air, or a mixture of two or more of these oxidising agents. The amount of oxidising agent to be used within this framework may easily be determined by an expert in the field, on the basis of the conditions generally employed in the field of hydrothermal degradation.

According to a particular method, the organic compound present may be a nitrogenous organic compound. Such a compound generally leads to the formation of nitrogen oxides $NO_x$ (NO, $N_2O_4$, $NO_2$, or $N_2O$, especially) under the conditions of step (II). In this case, it is therefore most often desirable to eliminate these nitrogen oxides $NO_x$, most particularly when the method of the invention is conducted within the framework of processing of industrial effluent intended for discharge into the environment. To this end, the method may advantageously be carried out by introducing, in step (I), an additional quantity of $NH_4^+$ cations in aqueous solution, generally in the form of an aqueous ammonia solution, in order to convert the nitrogen oxides $NO_x$ into nitrogen and water during step (II).

Thus, when the effluent E processed according to the method of the invention comprises a nitrogenous organic compound, it is most often advantageous that, in step (I), the addition of the $NH_4^+$ cations in aqueous solution is carried out so as to obtain in the medium to be processed in step (II) a molar ratio $NH_4^+/(NO_3^- + N_{org})$ (where $N_{org}$ represents the amount of nitrogen present in the nitrogenous organic compound) of at least 1:3, and preferably at least 2:3. More preferentially, especially in order to avoid as far as possible the formation of by-products, this ratio $NH_4^+/(NO_3^- + N_{org})$ is at least 3:3, and advantageously at least 4:3, this ratio remaining in general at or below 6:3, particularly for reasons of cost. Thus, advantageously in terms of cost/efficiency ratio, the ratio $NH_4^+/(NO_3^- + N_{org})$ may be between 4:3 and 6:3, for example between 4.5:3 and 5.5:3, this ratio being typically of the order of 5:3.

According to another variant of the method of the invention, the aqueous effluent E may also contain nitrogen oxides $NO_x$, in addition to the nitrate or nitrite salts present in aqueous solution. In this case again, it is most often indicated that the method should be carried out by introducing an additional quantity of $NH_4^+$ cations in aqueous solution in step (1), generally in the form of an aqueous ammonia solution, in order to convert the nitrogen oxides $NO_x$ into nitrogen and water during step (II). In this case, the $NH_4^+$ cations in aqueous solution are in general added in step (I) so as to obtain in the medium to be processed in step (II) a molar ratio $NH_4^+/(NO_3^- + NO_x)$ of at least 1:3, preferably at least 2:3, and advantageously at least 3:3, this ratio nevertheless remaining in general at or below 6:3, especially for reasons of cost. Thus, the ratio $NH_4^+/(NO_3^-+NO_x)$ is advantageously between 4:3 and 6:3, for example between 4.5:3 and 5.5:3, this ratio being typically of about 5:3.

According to another particular variant, the aqueous effluent E contains, in addition to metal M nitrates or nitrites, both an organic compound and nitrogen oxides $NO_x$. In this case, the method advantageously has the following features:

in step (I), an additional quantity of $NH_4^+$ cations in aqueous solution is introduced, preferably in the form of an aqueous ammonia solution, in order to convert the said oxides $NO_x$ into nitrogen and water during step (II); and step (II) is conducted with the additional presence of an oxidising agent, in an amount sufficient to oxidise the said organic compound under the conditions of step (II).

According to this SPECIFIC variant, when the aqueous effluent E contains a nitrogenous organic compound as the organic compound, leading to the formation of $NO_x$ under the conditions of step (II), it is in general indicated that an additional quantity of $NH_4^+$ cations in aqueous solution should be introduced in step (I), in order to convert the oxides $NO_x$ into nitrogen and water during step (II). In this case, in step (I), $NH_4^+$ cations in aqueous solution are in general introduced so as to obtain in the medium to be processed in step (II) a molar ratio $NH_4^+/(NO_3^-+NO_x+N_{org})$ (where $N_{org}$ represents the amount of nitrogen present in the nitrogenous organic compound) of at least 1:3, preferably at least 2:3, and advantageously at least 3:3, this ratio nevertheless remaining most often at or below 6:3. The ratio $NH_4^+/(NO_3^-+NO_x+N_{org})$ is advantageously between 4:3 and 6:3, for example between 4.5:3 and 5.5:3, and is typically of the order of 5:3.

Different aspects and advantages of the method of the invention will become even more explicit from the examples given below.

EXAMPLE 1

Treatment of an Aqueous Effluent Containing a Metal Nitrate (Iron Nitrate)

9.5 g of an aqueous solution of iron nitrate having a concentration of 111.2 g/l was processed according to the method of the invention. This solution initially contained 0.24 g of Fe in the form of the dissolved salt.

To the 9.5 g of aqueous solution of iron nitrate, 4.2 g of an aqueous ammonium solution $NH_4OH$ at 173 g/l were first of all added.

The medium obtained was then introduced into a glass tube, which was placed in a closed reactor, at an initial temperature of 40° C. The reactor, of the closed type, had a capacity of 100 ml and was equipped with a heating coil, and was coupled to a high pressure bench. The temperature of the reactor was raised from 40° C. to 450° C. in a period of 20 minutes, thereby obtaining a pressure of 25.5 MPa within the reactor.

The medium was processed under the supercritical conditions thus reached (temperature of 450° C. and pressure of 25.5 MPa) for 15 minutes.

Following this processing step, the medium was brought back to atmospheric pressure, and allowed to cool to ambient temperature (25° C.) in 45 minutes.

At the end of this processing step, the quantitative conversion of the iron nitrate into iron oxide, $N_2$ and $H_2O$ had been obtained. More precisely, the aqueous medium obtained at the end of the processing step contained 0.33 g of $Fe_2O_3$, the theoretical mass expected of $Fe_2O_3$, corresponding to the total conversion of the Fe initially present in the solution, being 0.35 g. In other words, conversion of the iron nitrate into oxide $Fe_2O_3$ was obtained with a yield of 94%.

EXAMPLE 2

Treatment of an Aqueous Effluent Containing a Metal Nitrate (Iron Nitrate) and an Organic Compound (Acetic Acid)

An aqueous medium consisting of a mixture of 4.8 g of an aqueous solution of iron nitrate having a concentration of 111.2 g/l and 3 g of acetic acid was processed according to the method of the invention. The solution initially contained 0.12 g of Fe in the form of the dissolved salt and had a COD (chemical oxygen demand) of 35 g/l.

To the 9.5 g of aqueous solution of iron nitrate were added 2.2 g of an aqueous ammonium solution $NH_4OH$ at 173 g/l and 4.4 g of an aqueous solution of hydrogen peroxide in aqueous solution at 50% by mass.

The medium thus obtained was introduced into a glass tube, which was placed in a closed reactor, at an initial temperature of 40° C. The reactor, of the closed type, had a capacity of 100 ml and was equipped with a heating coil, and was coupled to a high pressure bench. The temperature of the reactor was raised from 40° C. to 450° C. in a period of 20 minutes, thereby obtaining a pressure of 25.5 MPa within the reactor.

The medium was processed under the supercritical conditions thus reached (temperature of 450° C. and pressure of 25.5 MPa) for 15 minutes.

Following this processing step, the medium was brought back to atmospheric pressure, and allowed to cool to ambient temperature (25° C.) in 45 minutes.

At the end of this processing step, the quantitative conversion of the iron nitrate and the organic compound into iron oxide, $N_2$, $CO_2$ and $H_2O$ had been obtained. More precisely, the aqueous medium obtained at the end of the processing contained:

0.165 g of $Fe_2O_3$, the theoretical mass expected of $Fe_2O_3$, corresponding to the total conversion of the Fe initially present in the solution, being 0.18 g, (conversion of the iron nitrate into oxide $Fe_2O_3$ was obtained with a yield of 92%.

a content of organic compound corresponding to a final COD of 1.75 g/l (reduction of the COD by 95%).

The invention claimed is:

1. A method for treating an aqueous effluent E containing, in solution, at least one nitrate or nitrite of a metal M, said metal M having an oxide stable in an aqueous medium, the said method comprising:

(I) introducing $NH_4^+$ cations in aqueous solution into the aqueous effluent E; and then (II) treating the medium obtained in step (I) at a temperature of 100 to 700° C. and a pressure of 1 to 50 MPa, whereby the nitrate or nitrite of the metal M is converted into an insoluble oxide of the metal M, nitrogen and water.

2. The method of claim 1, wherein, in step (I), the $NH_4^+$ cations are introduced in the form of an aqueous ammonia solution.

3. The method of claim 1, wherein the aqueous effluent E contains at least one nitrate of metal M and, in step (I), the $NH_4^+$ cations in aqueous solution are introduced so as to obtain in the medium to be processed in step (II) a molar ratio $NH_4^+/NO_3^-$ of at least 1:3.

4. The method of claim 3, wherein the molar ratio $NH_4^+/NO_3^-$ is between 4:3 and 6:3.

5. The method of claim 1, wherein step (II) is conducted at a temperature of between 250 and 550° C. and a pressure of between 10 and 40 MPa.

6. The method of claim 1, wherein step (II) is conducted under supercritical conditions, at a temperature of 374° C. to 700° C. and a pressure of 22.1 MPa to 50 MPa.

7. The method of claim 6, wherein the metal M is iron.

8. The method of claim 1, wherein the metal M is selected from beryllium Be, magnesium Mg, strontium Sr, titanium Ti, vanadium V, chromium Cr, manganese Mn, iron Fe, cobalt Co, nickel Ni, copper Cu, zinc Zn, niobium Nb, molybdenum Mo, thorium Th, uranium U, plutonium Pu, aluminium Al, lead Pb and tin Sn.

9. The method of claim 1 wherein the aqueous effluent E contains in addition an organic compound, and step (II) is conducted with the additional presence of an oxidising agent, in an amount sufficient to oxidise the said organic compound under the conditions of step (II).

10. The method of claim 1, wherein the organic compound is a nitrogenous organic compound capable of leading to the formation of nitrogen oxides $NO_x$ under the conditions of step (II), and, in step (I), an additional quantity of $NH_4^+$ cations in aqueous solution is introduced, in order to convert the nitrogen oxides $NO_x$ into nitrogen and water during step (II).

11. The method of claim 10, wherein the aqueous effluent E contains at least one nitrate of metal M and, in step (I), the addition of the $NH_4^+$ cations in aqueous solution is carried out so as to obtain in the medium to be processed in step (II) a molar ratio $NH_4^+/(NO_3^-+N_{org})$ of at least 1:3, wherein $N_{org}$ represents the amount of nitrogen present in the nitrogenous organic compound.

12. The method of claim 11, wherein the molar ratio $NH_4^+/(NO_3^-+N_{org})$ is between 4:3 and 6:3.

13. The method of claim 1, wherein the aqueous effluent E contains in addition nitrogen oxides $NO_x$, and in that, in step (I), an additional quantity of $NH_4^+$ cations in aqueous solution is introduced in order to convert the nitrogen oxides $NO_x$ into nitrogen and water during step (II).

14. The method of claim 13, wherein the aqueous effluent E contains at least one nitrate of metal M and, in step (I), $NH_4^+$ cations in aqueous solution are added so as to obtain in the medium to be processed in step (II) a molar ratio $NH_4^+/(NO_3^-+NO_x)$ of at least 1:3.

15. The method of claim 14, wherein the molar ratio $NH_4^+/(NO_3^-+NO_x)$ is between 4:3 and 6:3.

16. The method of claim 1, wherein the aqueous effluent E contains, in addition to the metal M nitrate or nitrite, an organic compound and nitrogen oxides $NO_x$, and in that:
   in step (I), an additional quantity of $NH_4^+$ cations in aqueous solution is introduced in order to convert the said oxides $NO_x$ into nitrogen and water during step (II); and
   step (II) is conducted with the additional presence of an oxidising agent, in an amount sufficient to oxidise the said organic compound under the conditions of step (II).

17. The method of claim 16, wherein the organic compound is a nitrogenous organic compound under the conditions of step (II), leading to the formation of $NO_x$ under the conditions of step (II), and in that, in step (I), an additional quantity of $NH_4^+$ cations in aqueous solution is introduced in order to convert the oxides $NO_x$ into nitrogen and water during step (II).

18. The method of claim 17, wherein the aqueous effluent E contains at least one nitrate of metal M and, in step (I), $NH_{4+}$ cations in aqueous solution are introduced so as to obtain in the medium to be processed in step (II) a molar ratio $NH_4^+/(NO_3^-+NO_x+N_{org})$ of at least 1:3, wherein $N_{org}$ represents the amount of nitrogen present in the nitrogenous organic compound.

19. The method of claim 18, wherein the molar ratio $NH_4^+/(NO_3^-+NO_x+N_{org})$ is between 4:3 and 6:3.

* * * * *